INVENTOR.
Walter J. Denkowski

BY Paul & Paul
ATTORNEYS.

Aug. 18, 1970   W. J. DENKOWSKI   3,524,526
OVERLOAD LIMIT SWITCH FOR A VALVE ACTUATOR
Filed Nov. 6, 1968   4 Sheets-Sheet 3

INVENTOR.
Walter J. Denkowski
BY
Paul + Paul
ATTORNEYS.

INVENTOR.
Walter J. Denkowski

United States Patent Office 3,524,526
Patented Aug. 18, 1970

3,524,526
OVERLOAD LIMIT SWITCH FOR
A VALVE ACTUATOR
Walter J. Denkowski, King of Prussia, Pa., assignor to King of Prussia Research and Development Corporation, King of Prussia, Pa., a corporation of Pennsylvania
Filed Nov. 6, 1968, Ser. No. 773,852
Int. Cl. F16d 17/00; F16k 31/05; H01h 3/16
U.S. Cl. 192—141                             10 Claims

ABSTRACT OF THE DISCLOSURE

A motor-driven valve operator is disclosed for opening and closing the valve or valve gate. Limit-switch means are provided responsive to valve-seating forces created at the closing of the valve gate for opening the motor power circuit to shut off the motor. The motor drive includes a motor gear train comprising only spur gears. No worm or worm gear is involved. The limit switch is opened in response to reaction forces set up in the shaft of one of the spur gears in the gear train. The valve operator may also be operated by hand wheel.

BACKGROUND OF THE INVENTION

The invention relates to motorized drive and control mechanism for power operated valves in which provision is made for automatically controlling the limit of closing the valve as operated by the motor. Provision is also made for operating the valve operator selectively either by motor drive or by hand wheel.

An example of the valve operator of the type referred to above is described in U.S. Pat. 2,114,013, issued to Russell C. Ball, Apr. 12, 1938, entitled,"Valve Control." The Ball patent is owned by Philadelphia Gear Corporation, of which the assignee of the present application is a wholly-owned subsidiary. In the Ball patent, the motor drive drives a shaft having thereon a worm which engages a worm gear which is keyed to a nut which drives the valve stem. When the valve seats, the worm senses the torque and reacts thereto. This reaction opens a switch and shuts off the motor. More specifically, the Ball patent discloses limit switch means which are responsive to valve-seating forces at the closing of the valve gate for opening the motor circuit to shut down the motor. In the valve operator construction disclosed in the Ball patent, when the valve seats, the resistance offered by the seating of the valve gate is transmitted through the worm gear and causes the worm to be displaced longitudinally on the worm shaft, against a biasing spring force. The displacement of the worm on its shaft is effective to operate a limit-switch mechanism which controls the motor circuit. The switch mechanism is referred to in Ball patent as an overload responsive switch or a torque limit switch.

SUMMARY OF THE INVENTION

An important object of the present invention is to provide a valve operator, having a torque-limiting mechanism for opening the motor circuit when the valve seats, which can be housed in a housing having substantially less width than has been heretofore required by the motor-driven torque-limiting valve operators of the prior art.

An important feature of the present invention is that the torque-sensitive motor-operated valve operator of the invention employs only spur gears, as distinguished from worm and worm gears, and which provides for converting the torsional force exerted on the stem when the valve seats into an axial force for moving a limit-switch shaft in a longitudinal direction to open the switch to shut off the motor drive.

A further feature of one form of the present invention is that the reaction forces which are created when the valve seats are confined within the drive sleeve; there are no linear reaction forces on the housing, only the torsional forces on the bolts.

A further important feature of the present invention is that the gear train of the invention operates at high efficiency (as compared with the low efficiency of the worm and worm gear mechanism of the prior art) thereby reducing the power requirements and thereby permitting the use of smaller motor and smaller housing.

DESCRIPTION OF THE PREFERRED EMBODIMENTS

Figure 1:
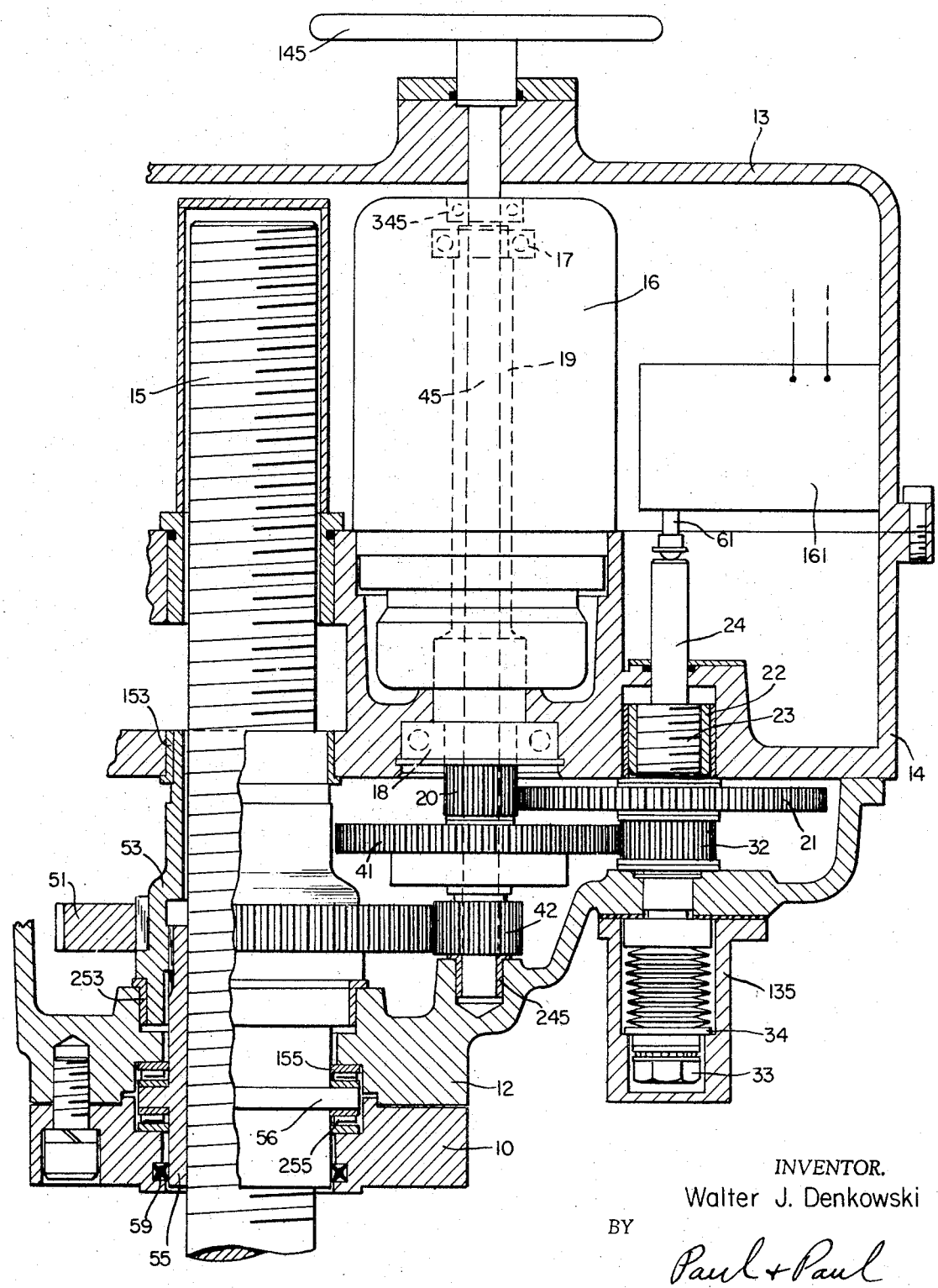
FIG. 1 is an elevational view, partly in section, of the new motor drive and torque-sensitive limit-switch valve operator.
Figure 2:
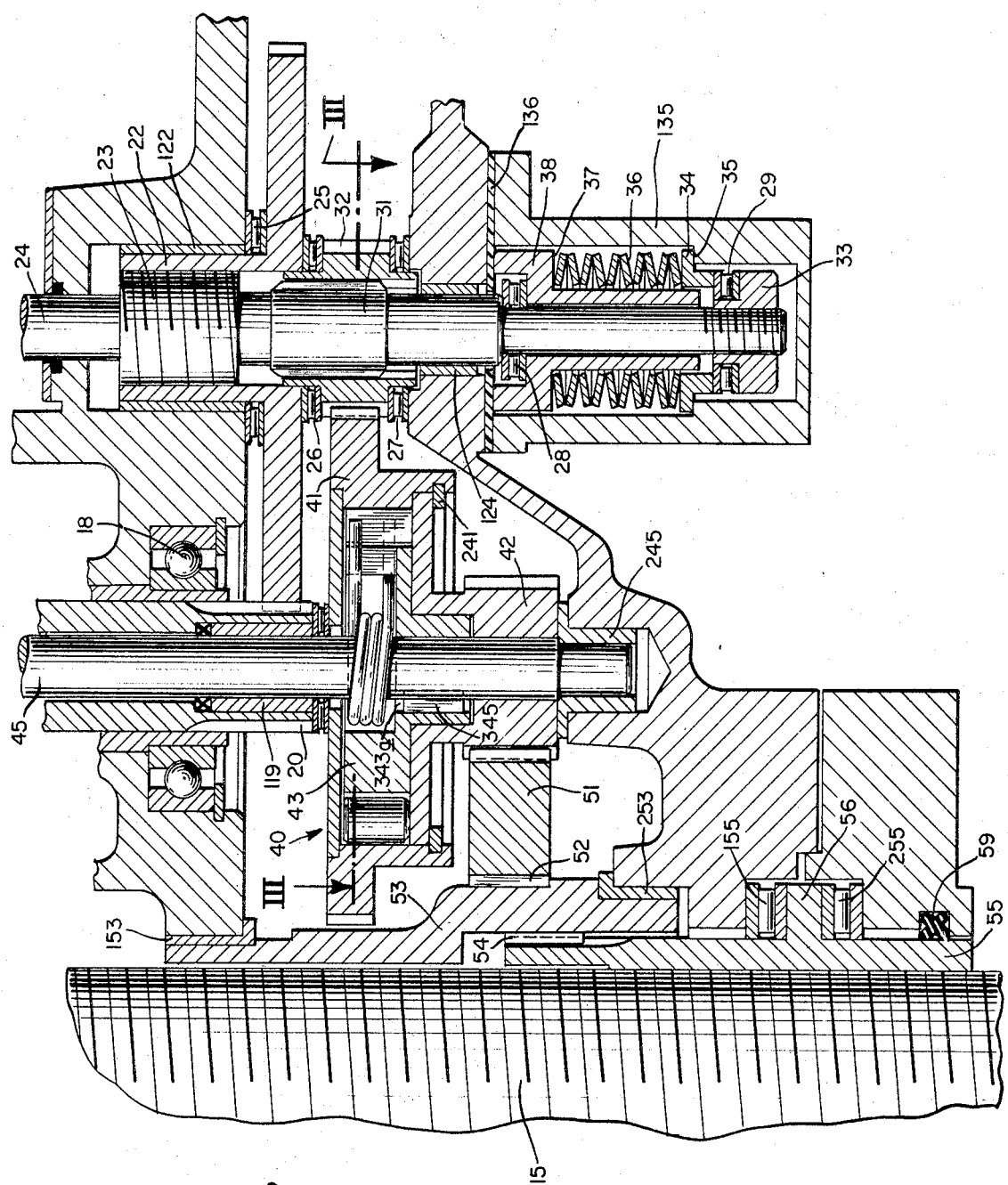
FIG. 2 is an enlarged view of a portion of FIG. 1, showing in section, the details of the spur gear train, the clutch, and the torque-sensitive limit-switch shaft.

Referring now to FIGS. 1 and 2, the valve-operator motor drive and torque-sensitive limit-switch mechanism is shown housed in a housing having a lower or base portion 12, an upper portion 14, and a cover 13. The unit is supported on a mounting flange 10, which would be the top flange of the yoke of the valve (not shown). The valve stem 15 projects upwardly from the valve through the flange plate 10 into the housing of the motor drive and torque-sensitive limit-switch unit.

Mounted within the upper housing is a reversible electric motor 16 for driving a sleeve 19 supported for rotation on ball bearings 17 and 18. The lowermost end of the motor-drive sleeve 19 is provided with spur gear teeth 20 which mesh with a spur gear 21 on the torque-sensitive limit switch shaft 24.

A hand wheel shaft 45, rotatable by hand wheel 145, extends through the motor drive sleeve 19 and is supported at its lower end by a bearing 245 and by the sleeve bushing 119. A ball bearing 345 supports the shaft 45 at the upper end of the motor frame.

The torque-sensitive limit-switch shaft 24 is supported on a thrust bearing 28 and by a sleeve bearing 124. Spur gear 21 on shaft 24 has an upstanding hub portion 22 which is supported for rotation in sleeve bearing 122. The hub 22 is internally threaded to engage with the threads of an enlarged-diameter externally-threaded portion 23 which is integral with, or keyed to, the torque-sensitive limit switch shaft 24. Spur gear 21 is supported by suitable thrust bearings 25–26.

When the spur gear 21 and its hub 22 are driven rotationally by the motor drive-sleeve gear 20, the torque-sensitive limit-switch shaft 24 rotates therewith, due to the fact that the externally threaded portion 23 follows the rotation of hub 122.

Shaft 24 inclues, at about the center portion thereof, an integral externally-splined portion 31 which is in mesh with the splines of internally-splined spur gear 32. Spur gear 32, supported by thrust bearings 26–27, is in mesh with the teeth of the input member 41 of a clutch device 40.

The clutch device 40 is illustrated in detail in FIGS. 3 and 4 and will be described in greater detail later. It is sufficient to say at the present time that when the power input member 41 is driven rotationally by the spur 32, the output member 42 of the clutch device 40 is driven rotationally, and since the output member 42 has external teeth which mesh with a spur gear 51, gear 51 is driven rotationally.

Spur gear 51 is keyed, as by key 52, to a drive sleeve 53 and supported for rotation in the bushings 153 and 253. Sleeve 53 is splined, as by splines 54, to a stem nut 55 having internal threads which engage with the external threads of the stem 15. Thus, when the sleeve 53 is driven rotationally by the spur gear 51, the nut 55 rotates, and, since the nut 55 is held by the housing against axial movement, when the nut 55 rotates the stem 15 is moved in its axial direction, either upwardly or downwardly, according to the direction of rotation of nut 55. Nut 55 is held against axial movement by a circumferential shoulder 56 which is supported between thrust bearings 155 and 255. Suitable seals 59 prevent escape of lubricant along the nut 55.

In brief, then, the reversible electric motor 16 drives the valve stem 15 either upwardly or downwardly by causing rotation of nut 55 in one direction or the other. The connection from the motor 16 to the nut 55 may be traced through the motor-drive sleeve 19, spur gear 20 at the lower end of the drive sleeve, spur gear 21 on shaft 24 and the internally threaded hub 22 which engages the externally threaded portion 23 of shaft 24, the externally splined portion 31 of shaft 24, the spur gear 32, the spur gear teeth on the external circumferential surface of input member 41 of the clutch 40, the output member 42 of clutch 40 the external teeth of which engage the teeth of spur gear 51, the sleeve 53 keyed to the gear 51, and nut 55 splined to the sleeve 53.

Assume that the motor 16 is driving the stem 15 downwardly in a direction to seat the valve. When the valve seats, resistance to further longitudinal movement of stem 15 develops, and stem 15 stops moving longitudinally. Nut 55 stops rotating and so does sleeve 53, gear 51 and output member 42 of clutch 40. As will be described in greater detail later, when output member 42 of clutch 40 stops rotating, input member 41 is also prevented from rotating.

When, as just described, power input member 41 of clutch 40 is prevented from rotating, spur gear 32 is also prevented from rotating, and since gear 32 is splined to section 41 of shaft 24, shaft 24 stops rotating. Thus, the externally threaded section 23 of shaft 24 is no longer free to rotate.

The continued rotation of gear 21 and of the internally-threaded gear hub 22, with the externally-threaded section 23 of shaft 24 held against rotation, forces shaft 24 to move in its axial direction, the direction of rotation of hub 22 relative to section 23 being such that shaft 24 is moved upwardly until the upper end of shaft 24 strikes switch plunger 61 of the electrical control box 161, thereby opening the circuit to motor 16 and shutting down the motor drive.

The lowermost end of the shaft 24 is provided with a nut 33 which carries a thrust bearing 29, which in turn carries a spring retainer 34 which rests on a shoulder 35 of the housing 135. Retainer 34 supports a Belleville spring washer assembly 36 which extends between a shoulder 37 of a thrust and guide sleeve 38 and retainer 34. It will be seen that the Belleville spring washer assembly normally maintains shaft 24 in an axially stable position between shoulder 35 of housing 135 and mounting face 136, the bearing mountings allowing the shaft 24 to rotate freely with the hub 22 of driving gear 21. When, however, the shaft 24 is prevented from rotating, the shaft 24 is moved upward by the rotation of hub 22, compressing the Belleville spring washers, and allowing the upper end of shaft 24 to engage switch plunger 61 to shut off the motor.

The details of the clutch 40 will now be described. FIG. 3 is a cross section of the clutch looking down along the line III—III of FIG. 2. FIG. 4 is an exploded elevational view of the clutch elements. The clutch 40 comprises a power input element 41, an output element 42 and a handwheel input element 43. All three of the elements 41, 42 and 43 are mounted concentrically on the handwheel shaft 45. Both the power input element 41 and the output element 42 are provided with circumferential spur gear teeth.

Figure 3:
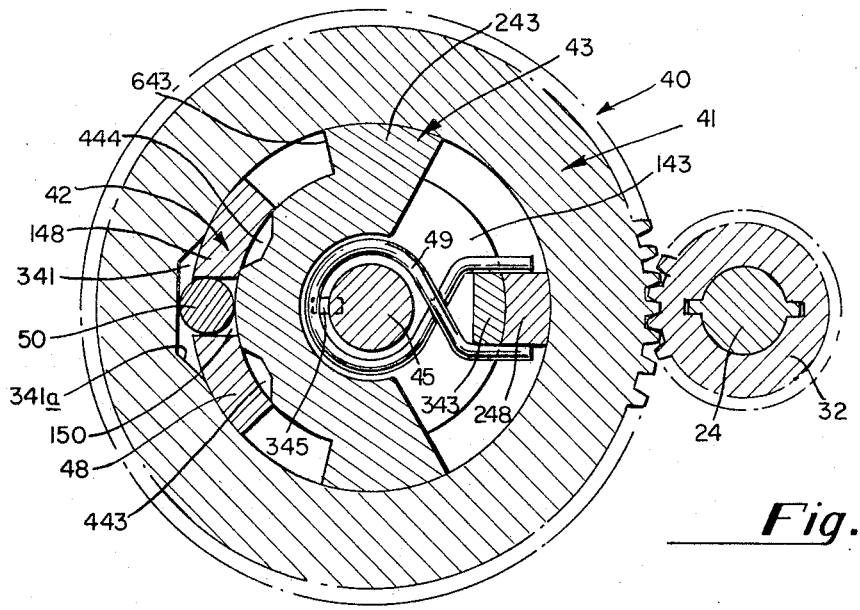
FIG. 3 is a view, in section, of the clutch looking down along the line III—III of FIG. 2.
Figure 4:
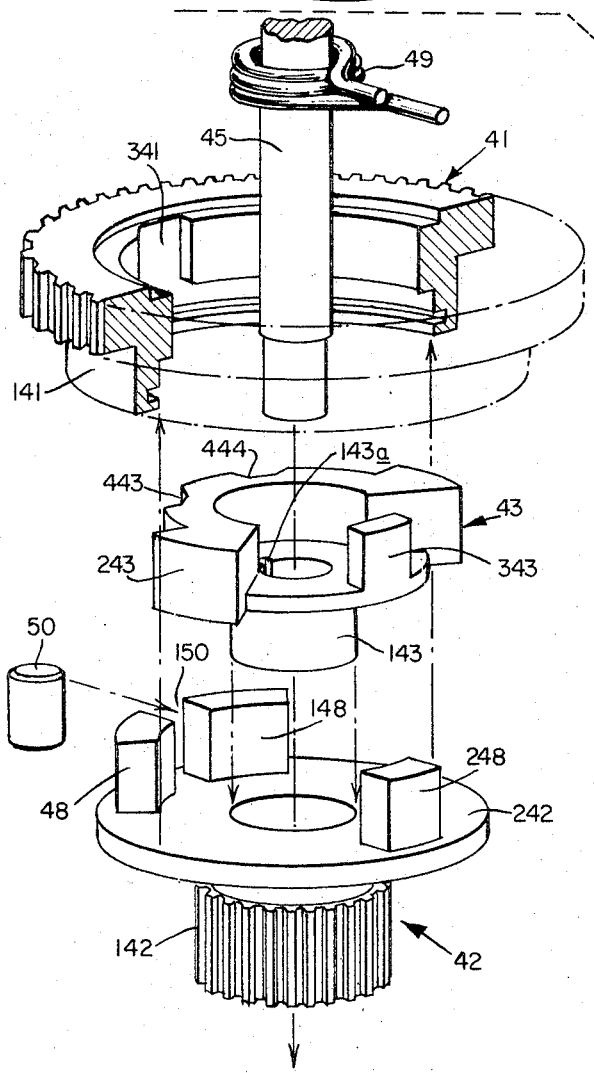
FIG. 4 is an exploded elevational view of the clutch of FIGS. 2 and 3.

As seen clearly in FIG. 4, output element 42 of clutch 40 is generally T-shaped in cross section having above the lower spur gear or toothed portion 142 an enlarged annular disc portion 242. Projecting upwardly from the upper surface of disc 242 are three lugs 48, 148 and 248 located as shown in the FIGS. 3 and 4.

Handwheel input element 43 of clutch 40 is likewise generally T-shaped in cross section. Its lower portion 143 is received within the center bore of the output element 42 and its upper portion 243 rests on and is supported by the upper surface of the disc 242. Upper portion 243 of intermediate element 43 includes an upstanding lug 343. The depending portion 143 has a keyway 143a for receiving the key 345 of handwheel shaft 45.

As best seen in FIG. 3, a torsional spring 49 tends to maintain lug 343 of handwheel input element 43 in radial alignment with lug 248 of output element 42. The remaining portion of the upper portion 243 of element 43 has a cross-sectional shape best seen in FIG. 3. A roller element 50 is received within the slot 150 formed between the two upstanding lugs 48 and 148 of output element 42.

Power input element 41 of clutch 40, also generally T-shaped in cross section, has a depending annular portion 141 which receives the disc portion 242 of the output element 42. A snap ring 241 (FIG. 2) retains the disc 242 in the portion 141.

The inner circumferential surface of power input element 41 is provided with a groove or recess 341 the side walls of which are inclined or sloping forming camming surfaces for the roller 50. The surface of upper portion 243 of handwheel input element 43 which faces the lugs 48 and 148 is provided with a pair of spaced-apart grooves or recesses 443 and 444 having inclined side walls for camming the roller 50.

The operation of clutch 40 will now be described. Assume that gear 32 on shaft 24 is driving power input element 41 clockwise, as viewed in FIG. 3. As soon as the sloping side wall 341a of recess 341 engages the roller 50, the lug 148 is urged in a clockwise direction, and as a result the output element 42 is driven rotationally. The handwheel input element 43 is free to rotate and, since spring 49 tends to hold lug 343 in alignment with lug 248, element 43 rotates with the output element 42. The relative positions of the intermediate element 43 and the output element 42 are shown in FIG. 3.

When, as a result of the valve seating, the stem 15 is prevented from moving longitudinally and the output element 42 of clutch 40 stops rotating, the power input element 41 also stops rotating, due to the projection of roller 50 from the slot 150. Gear 32 now stops rotating and, as previously described, the intermeshing of the threads of now nonrotating shaft portion 23 with the threads of rotating gear hub 22 sets up reaction forces which cause the shaft 24 to move axially upward to contact the switch plunger 61 to open the switch and shut off the motor.

Assume now that the valve is to be opened (or closed) by manually operating the handwheel 145. Assume that the handwheel is rotated in a direction to rotate shaft 45 counterclockwise as viewed in FIG. 3. Shaft 45 is keyed, as by key 345, to the handwheel input element 43, and accordingly element 43 moves counterclockwise. Spring 49 maintains lug 248 of element 42 in alignment with lug 343 of element 43, and accordingly output element 42 moves counterclockwise with element 43 but only until roller 50 engages the sloping wall 341a of recess 341 of power input element 41. The power input element 41 is not able to rotate, due to the friction of the step-up gearing toward the motor. As a result, output element 42 stops rotating while handwheel input element 43 continues to rotate counterclockwise. When wall 643 of the extension portion of element 43 reaches and abuts against the wall of the lug 148, the recess 444 is aligned radially with the slot 150, and the reaction force on the sloping wall 341a forces roller 50 into the recess 444, thereby releasing the output element 42 for rotation with the handwheel input element 43. During this rotation, lug 248 is out of alignment with lug 343. When the manual rotation of the handwheel 145 is stopped, the coil spring 49 returns the lug 343 into radial alignment with lug 248, and elements 43 and 42 take up the relative positions illustrated in FIG. 3 in which the land portion of element 43 between recesses 443 and 444 is aligned with the slot 150 of element 42.

Figure 5:
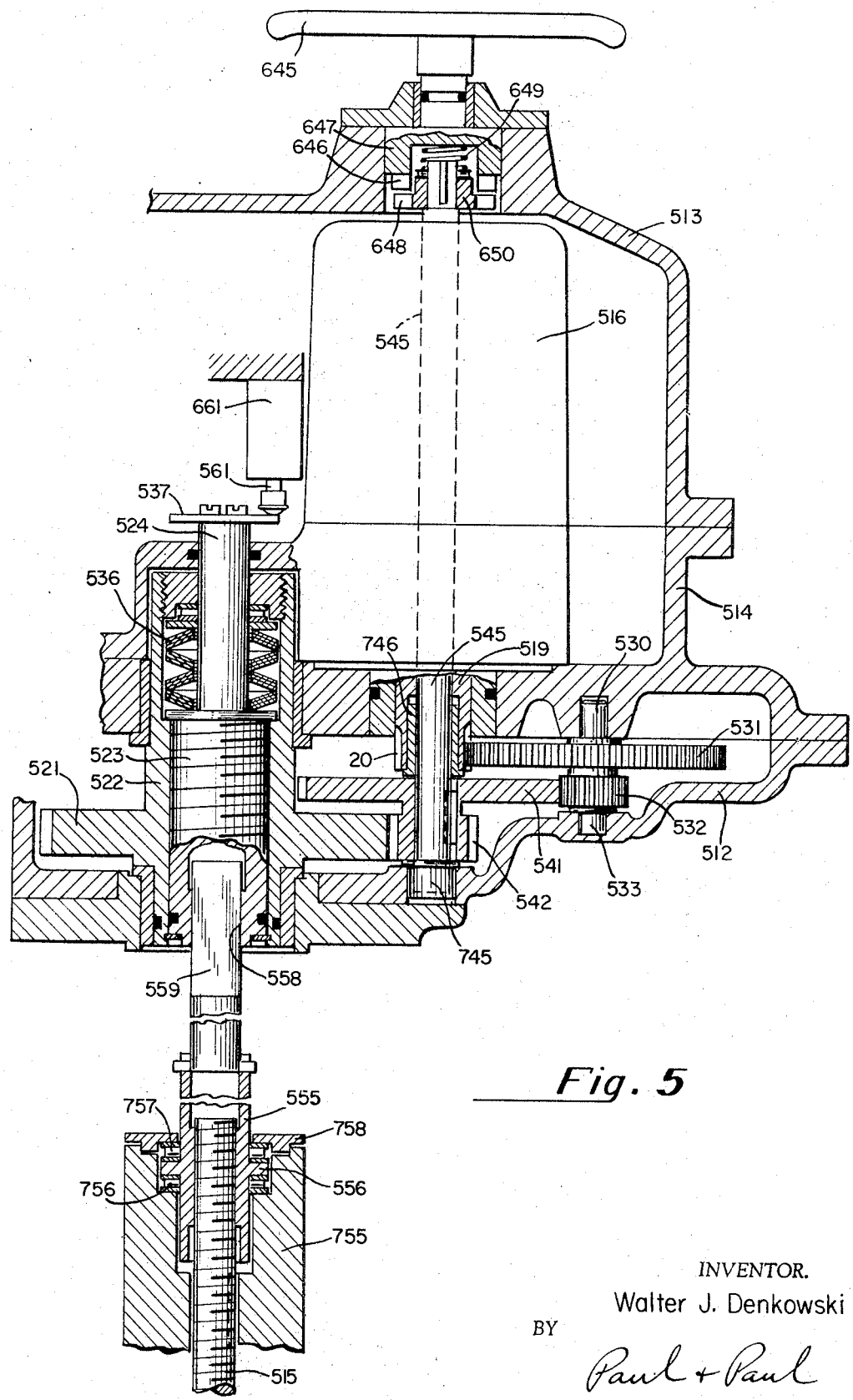
FIG. 5 is an elevational view of a modified form of motor drive and torque-sensitive limit-switch operating mechanism.

FIG. 5 illustrates a modified form of valve operator having limit-switch means responsive to valve-seating forces created by the closing of the valve gate for opening the motor power circuit to shut off the motor. In FIG. 5, the reversible electric motor 516 drives a sleeve 519 which surrounds a shaft 545 which is supported in bushings 745 and 746. As described later, the shaft 545 is normally held out of connection with the handwheel 645 by the spring 649 but shaft 545 becomes connected to the handwheel when the handwheel is depressed.

The motor drive sleeve 519 has a spur-tooth pinion 20 at its lower end which is in mesh with and drives the spur gear 531 keyed on the shaft 530. The shaft 530 is supported in a bushing 533 in the housing 512. Keyed to shaft 530 is a pinion 532 which is in mesh with and drives the spur gear 541 keyed on the shaft 545. Also keyed on shaft 545 is a pinion 542 which meshes with and drives a spur gear 521.

Spur gear 521 has an upper hub portion 522 which is internally threaded and which engages with an externally threaded drive sleeve 523. The lower end portion of member 523 is provided with a square or hexagonal hole 558 (or other shape other than round) which receives a bar 559 of a cross section corresponding to that of hole 558 so as not to be rotatable therein. The lower end of bar 559 is secured to the upper end of nut 555 which is threaded on the valve stem 515. Nut 555 is supported for rotation on a shoulder in housing 755 by the thrust bearings 756 and 757 which engage a projection 556 of the nut. The nut 555 is prevented from moving axially upward by a retaining collar 758.

The coupling from the electric drive motor 516 to the nut 555 may be traced through the drive sleeve 519, pinion 20, spur gear 531, pinion 532, spur gear 541, pinion 542, spur gear 521, the internally-threaded hub 522, the axially-stable externally-threaded cylindrical member 523, bar 559, and nut 555. Since the nut 555 cannot move axially, rotation of the nut 555 causes the valve stem 515 to move axially, either upwardly to open the valve, or downwardly to close the valve, according to the direction of rotation of the nut 555.

Assume now that the valve has just seated. When this happens, further longitudinal movement of the stem 515 is prevented. This inhibits further rotation of nut 555, bar 559, and drive sleeve 523. Since the spur gear 521 and the internally-threaded hub 522 are continuing to rotate, the now nonrotating drive sleeve 523, being threaded thereto, reacts by moving axially upward, compressing the Belleville spring washer assembly 536 and causing the flange 537 of shaft 524 to engage the plunger 561 to open the switch 661 to shut off the motor 516.

In the modified structure shown in FIG. 5, when the handwheel 645 is to be used to open or close the valve, the operator presses the handwheel 645 down to cause the depending lugs 646 of the collar 647 to engage the upstanding lug 648 of the collar 650. The latter is keyed to shaft 545, so that rotation of the handwheel 645 in the down position rotates shaft 545, pinion 542 and gear 521 to drive the bar 559 and nut 555 through the threaded interengagement of gear hub 222 and cylindrical member 523, as previously described in connection with the power drive. Rotation of the handwheel in the down position also rotates gear elements 541, 532, 531 and 20 to cause rotation of the power drive shaft 519, but since the motor power is off this is of no consequence.

It will be noted that in FIG. 5, the annular gear 521 and its internally threaded hub portion 522 are in coaxial alignment, not only with the limit shaft 524, but also with the nut 555 and stem 515. This arrangement requires but a narrow housing which is of important advantage in certain installations.

It is to be noted that the torque-sensitive valve operators illustrated and described hereinabove employ only spur gears. No worm or worm gear are used. This has an important advantage in that spur gear efficiency is much higher than worm gear efficiency. Spur gear efficiency of the apparatus described may, for example, be of the order of 90%, whereas worm gear efficiency of the prior art apparatus may be only 35–40%. The increased efficiency of the spur-gear arrangement of the present application reduces the power requirements and makes it possible to use a smaller motor, and hence a smaller housing.

A further advantage of the apparatus illustrated and described in FIG. 5 of the present application is that there is little or no loading on the housing, except for the torsional forces on the bolts. Substantially all the reaction or thrust forces are contained within the drive sleeve.

In the embodiment of FIG. 5, I have shown the handwheel spring biased out of engagement with the handwheel drive shaft, and a lug-on-lug arrangement for connecting the handwheel to the handwheel drive shaft. Alternatively, a clutch with detent roller embodying the technique of the clutch of FIGS. 1–4 may be used to couple the handwheel to the handwheel shaft.

While the preferred embodiments of this invention have been described in some detail, it will be obvious to one skilled in the art that various modifications may be made without departing from the invention as hereinafter claimed.

What is claimed is:
1. In a valve operator:
 (a) a housing;
 (b) an externally-threaded valve stem for opening and closing a valve;
 (c) a nut on said valve stem held by said housing against axial movement;
 (d) a power drive having an output shaft;
 (e) a limit switch element for shutting off the power drive;
 (f) a limit shaft movable axially for operating said limit switch element;
 (g) an annular gear coaxially mounted on the axis of said limit shaft and in threaded engagement therewith;
 (h) means normally biasing said limit shaft axially to maintain said limit switch element in a normally-closed switch position;
 (i) means coupling the power drive output shaft to said annular gear;
 (j) bearing means for said limit shaft and for said annular gear normally allowing said annular gear to drive rotationally said limit shaft through said threaded interengagement without causing axial movement of said shaft; and
 (k) means coupling said limit shaft to said nut;
 (l) whereby when the valve seats, rotation of said nut is inhibited, thereby inhibiting rotation of said limit shaft while said annular gear continues to be driven rotationally by said power output shaft;
 (m) whereby the reaction force of the threaded interengagement between said limit shaft and said annular gear causes said limit shaft to move axially in a di- rection to operate said limit switch element to open position to shut off the power to the power drive.

2. Apparatus according to claim 1 characterized in that said annular gear is internally threaded and in that said limit shaft has an externally threaded portion in engagement with the internal threads of said annular gear.

3. A valve operator according to claim 2 characterized in that gear means couple said limit shaft to said nut, and in that said gear means includes a pinion on said limit shaft and splined thereto for allowing relative movement between said pinion and said limit shaft.

4. Apparatus according to claim 3 characterized in that said power drive output shaft is a tubular shaft the bore of which receives a handwheel shaft connected to a handwheel.

5. Apparatus according to claim 4 further characterized in that said gear means coupling said limit shaft to said nut includes a clutch device mounted coaxially on said handwheel shaft, said clutch device having a power input element, a handwheel input element, and an output element selectively driven either by the power input element or by the handwheel input element.

6. Apparatus according to claim 5 further characterized in that said clutch device includes spherically-surfaced detent means operative to connect either said power input element or said handwheel input element to said output element according to whether said power input element or said handwheel input element is being driven.

7. Apparatus according to claim 6 further characterized in that said power input element of said clutch has a circumferential edge provided with gear teeth which mesh with the gear teeth of said pinion on said limit shaft.

8. Apparatus according to claim 7 further characterized in that said output element of said clutch is provided with gear teeth which mesh with a gear mounted on a sleeve located on the axis of said valve stem.

9. Apparatus according to claim 2 characterized in that said limit shaft and nut are coaxially aligned, and in that said means coupling said limit shaft to said nut includes a coaxial bar coupled between said nut and the externally threaded portion of said limit shaft by means allowing relative axial movement between said bar and said limit shaft but preventing relative rotational movement therebetween.

10. Apparatus according to claim 9 characterized in that said power output shaft is a tubular shaft the bore of which receives a handwheel output shaft.

References Cited

UNITED STATES PATENTS

| | | | |
|---|---|---|---|
| 2,517,373 | 8/1950 | Ambrose | 318—475 |
| 2,527,458 | 10/1950 | Schurr. | |
| 3,150,752 | 9/1964 | Baumann | 251—134 XR |
| 3,258,985 | 7/1966 | Jordan | 251—134 XR |
| 3,460,018 | 8/1969 | Cary | 318—475 |

MARK M. NEWMAN, Primary Examiner

A. D. HERRMANN, Assistant Examiner

U.S. Cl. X.R.

192—48.9, 95, 150; 200—47; 318—475; 251—134